UNITED STATES PATENT OFFICE.

ALBERT BRUNN, OF WIESBADEN, PRUSSIA, GERMANY.

OBTAINING PEPTONE AND MALTOSE.

SPECIFICATION forming part of Letters Patent No. 423,213, dated March 11, 1890.

Application filed February 21, 1889. Serial No. 300,766. (No specimens.) Patented in Germany December 7, 1886, No. 40,303, and July 9, 1887, No. 42,744; in France January 18, 1887, No. 180,983; in England October 24, 1887, No. 14,459, and in Belgium October 25, 1887, No. 79,313.

*To all whom it may concern:*

Be it known that I, ALBERT BRUNN, a subject of the King of Prussia, residing at Wiesbaden, Prussia, German Empire, have invented certain new and useful Improvements in the Process of Manufacturing Peptone and Maltose or Maltose Substances, (for which I have obtained Letters Patent in Germany, December 7, 1886, No. 40,303, and July 9, 1887, No. 42,744; in France, January 18, 1887, No. 180,983; in Great Britain, October 24, 1887, No. 14,459, and in Belgium, October 25, 1887, No. 79,313;) and I do hereby declare the following to be a full, clear, and exact description of the invention, such as will enable others skilled in the art to which it appertains to make and use the same.

During the fermentation of leaven a ferment is formed that is capable of converting albumen or the white of eggs or proteine into peptone, and, as I have also discovered, starch flour into maltose, in a manner similar to diastase. I have further found that the action of the ferment from leaven upon starch is similar to that of diastase, perhaps a little slower, and that such flour is thus converted in most cases, not into pure maltose, but into an intermediate product, which may be called a "maltose body," which I have not as yet been able to clearly define, but which on treatment with iodine will produce a light pink reaction, which seems to show conclusively that the substance is erythrodextrine. I cannot positively state the combinations formed by the action of a leaven ferment upon starch. I can only state that the starch is converted into combinations that are like or closely related to the maltose combinations, for which reason I have called them "maltose" substances or bodies. The composition of these maltose bodies, like that of diastase formed during the germination of barley, is not clearly definable or known, yet diastase is a body that has definite well-known properties, and may be obtained in a tolerably-pure state. This is the case with the ferment formed during the fermentation of leaves, and which I have called "leaven ferment."

The object of the present invention is the production of peptone preparations and simultaneously obtaining maltose substances by the aid of the ferment which is formed during the fermentation of the ordinary dough with leaven.

By "peptone" are here meant albuminous substances (proteine) converted into a soluble form, and which are not precipitated by boiling from their solutions acidified with hydrochloric acid. By "maltose" substances are meant the starchy substances converted into a soluble form, and which are contained in the substances employed. In order to attain this object, a dough is prepared with flour, bran, leaven, and water at a suitable temperature—say about 35° to 50° centigrade—to which is added an albuminous (proteine) substance—such as chopped meat—from which peptone can be formed in the proportion of about one kilogram of meat to two kilograms of bran and flour, and the whole is kneaded together and then allowed to undergo fermentation for several hours by exposure to a temperature of from 35° to 50° centigrade. After the dough has sufficiently fermented it is kneaded with water, and thereupon the solid part is separated from the liquid part in any suitable manner, as by centrifugal action, compression, filtration, or decantation. The ferment which is formed during the fermentation of the dough by the leaven, or which already exists in the leaven, transforms the albumen (proteine) of the albuminous substance added to the dough—for instance, the meat—into peptone. This action also takes place in part with the gluten of the flour contained in the dough whether albumen has been added thereto or not. The peptone produced by this process is soluble in water, and is therefore contained in the liquid obtained in the above-described manner. The liquid is then boiled and evaporated to dryness or to any other desired consistence—as, for example, a sirup. The flakes which are eliminated during this operation are separated from the liquid and can again be subjected to a peptonizing process. To this liquid or solid peptonizing preparation additions can be made for improving the flavor. It can be mixed with culinary salt, and the acid contained therein can be neutralized.

If instead of meat other albuminous (proteine) substances—such as, for example, milk, eggs, or the like—are employed, the water can of course in this case be wholly or partially dispensed with in the formation of dough. That the albumen (proteine) of the albuminous substances can also be peptonized by the ferment isolated from the dough fermented by the aid of the leaven is evident; but the peptonization by the direct application of the ferment contained in the fermented dough and not isolated is just as advantageous. Under certain circumstances the previous isolation of the ferment from the dough fermented by the aid of leaven by extraction of such ferment by means of a suitable solvent—as, for instance, water—or by any other process—for example, by the von Wittich, Cohnheim, or Musculus process—and the use of this ferment for peptonization may also be found of advantage. In this manner not only peptone but maltose or maltose substances are obtained by reason of the action of the leaven ferment upon the starchy substances of the flour contained in the dough. The formation of the peptone and that of the maltose substance seem to be connected or related, the one depending upon the other, and it does not seem possible to carry out either of the said processes of conversion without simultaneously carrying out the other. The maltose passes with the peptone into the aqueous extract of the fermented dough, and although the separation of the maltose substances from the peptone is possible it will be desirable only in exceptional cases, as the product obtained can be used for maltose preparations containing peptone—as, for example, malt extracts and the like—and malt can accordingly be used in the original material.

Having described my invention, what I claim is—

1. The herein-described process of obtaining peptone and maltose or maltose substances, which consists in converting albuminous and starchy substances into peptone and maltose or maltose substances by fermentation and separating said peptone and maltose substances by lixiviation in water.

2. The herein-described process of obtaining peptone and maltose substances, which consists in preparing a dough of albuminous and starchy substances, mixing therewith a leaven, allowing the dough to undergo fermentation, and separating the soluble products of the reaction or conversion by lixiviation in water.

In testimony whereof I affix my signature in presence of two witnesses.

ALBERT BRUNN.

Witnesses:
ADOLF THOMAS,
CARL ED. HAHN.